April 7, 1970     C. E. CHRISTOPHERSEN     3,504,591
TORQUE LIMITING NUT
Filed Jan. 17, 1969
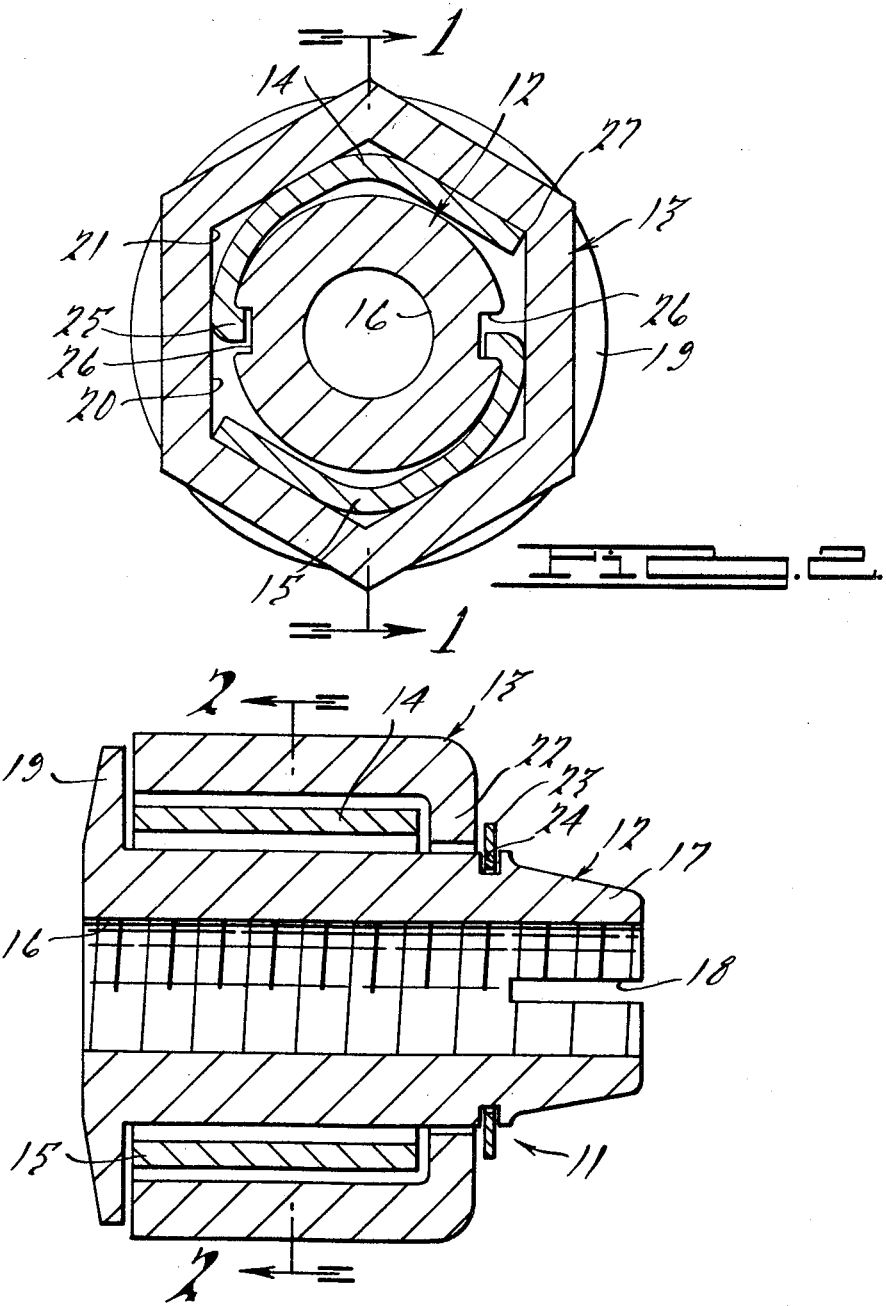
INVENTOR.
Clarence E. Christophersen
BY
Jerry K. Harness
his ATTORNEY.

United States Patent Office 3,504,591
Patented Apr. 7, 1970

3,504,591
TORQUE LIMITING NUT
Clarence E. Christophersen, Los Angeles, Calif., assignor to Aeroquip Corporation, Jackson, Mich.
Filed Jan. 17, 1969, Ser. No. 792,071
Int. Cl. F16b *31/02*
U.S. Cl. 85—61      4 Claims

ABSTRACT OF THE DISCLOSURE

A torque limiting nut comprising a polygonal shell rotatably supported by an internally threaded tubular body. Leaf type springs disposed between the shell and body are hooked at one end into grooves in the body and extend around the body in the same direction, tending to expand outwardly. Torque is transmitted from the shell through the leaf springs to the body until the leaf springs deflect, at which point the shall will rotate about the springs and body at a predetermined torque Backing off the shell causes the spring ends to engage the corners of the shell, unscrewing the body of the nut.

BACKGROUND OF THE INVENTION

Field of the invention

The invention relates to nuts of the type which will respond only up to a predetermined torque, thereby preventing the application of excessive forces on a bolt and providing uniform tightening of a number of nuts.

Description of the prior art

It is known to have nuts which incorporate means for limiting the torque effectively applied to them. Among such prior known torque limiting nuts are those shown in the following U.S. Patents: Dmitroff No. 2,685,812; Rubin No. 3,273,443; Rubin No. 3,280,689; and Rubin No. 3,289,524.

SUMMARY OF THE INVENTION

The present invention overcomes some of the disadvantages of previously known torque limiting nuts such as their relatively expensive and complicated nature, lack of satisfactory wear qualities, and other disadvantages which will become apparent by a comparison of such devices with this invention.

The invention comprises a polygonal shell having an internally directed flange at one end, the shell being rotatably supported by a generally tubular body having a threaded bore. A flange at one end of the body and a retaining ring at the other end hold the body on the shell. One or more leaf springs are disposed between the shell and body, these leaf springs having hooked ends retained by axially extending grooves in the body. The unstressed shape of the springs is such that they press against the inside of the shell, and torque may be transmitted from the shell to the body through the leaf springs until it increases to a point where the leaf springs will deflect or wrap around the body. At this point the shell will rotate about the springs and body at a predetermined torque.

Reversing the direction of the shell will cause the spring ends to engage the corners of the shell, permitting the nut to be backed off.

Among the advantages of this construction over those known in the prior art is the fact that there is a large area of spring contact to transfer the torque, but yet no sharp ratchet teeth which could wear and change the torque value. The lack of organic material in the nut permits it to be used at high temperatures, and the nut has threads along its entire length. Due to the spring construction, positive back-off action is provided. The nut has an improved appearance, with rounded and smooth corners, the spring mechanism being fully enclosed, and is economical to manufacture by drawing and stamping techniques.

BRIEF DESCRIPTION OF THE DRAWINGS

FIGURE 1 is a cross-sectional view in elevation of the nut taken along the line 1—1 of FIGURE 2; and FIGURE 2 is a plan cross-sectional view taken along the line 2—2 of FIGURE 1.

DESCRIPTION OF THE PREFERRED EMBODIMENT

The nut is generally indicated at 11 and comprises a body generally indicated at 12, a shell generally indicated at 13, the leaf springs 14 and 15. Body 12 is of generally tubular shape, having a threaded central bore 16 extending through its entire length. One end 17 of the body is tapered and slotted at 18 for reception by an appropriate part to be fastened by a stud or bolt (not shown) passing through bore 16. These slotted ends form inwardly deflected tabs for locking friction with the stud or bolt. The other end 19 of body 12 has an outwardly directed flange.

Shell 13 is of hexagonal shape, having six flat internal surfaces 20 forming sharp corners 21 at their junctures. Walls 20 are spaced a substantial distance from body 12. The diameter of flange 19 is such that it overlaps one end of shell 13, and the other end of the shell has an inturned flange 22 which closely surrounds body 12. A retaining ring 23 is disposed in groove 24 on body 12 adjacent flange 22 to hold shell 13 on the body.

The width of leaf springs 14 and 15 is equal to practically the entire length of shell 13, as seen in FIGURE 1. Each leaf spring has an inwardly bent tab 25 which is disposed in an axial groove 26, the two grooves 26 being diametrically opposite each other on body 12. Springs 14 and 15 extend circumferentially in the same direction around body 12, and their unstressed shape is such that when confined by the shell they tend to press against surfaces 20. The length of the springs in such that when portions of the springs adjacent tabs 25 are pressing against an intermediate portion of a surface 20, the outer edge of the spring fits into a corner 22 of the shell. It should be noted that more than two springs could be used depending on the contemplated use and size of the device without departing from the scope of the invention. It should also be noted that the spring may be formed of a laminated construction to provide the proper torque setting.

In operation, nut 11 will be applied to a bolt or stud (not shown) and rotated clockwise in FIGURE 2. When the nut reaches its home position, further clockwise rotation of shell 13 by a wrench will transmit forces through springs 14 and 15. The portions of these springs remote from tabs 25 will be urged inwardly by the camming forces exerted by surfaces 20 of the shell. However, the springs will resist these camming forces until a predetermined torque is exerted on the shell. At this point, further increase in torque will cause the outer ends of the springs to collapse or wrap around body 12, so that the body will not turn any further. This will in effect limit the torque applied to the body.

When it is desired to back off the nut, it is merely necessary to rotate shell 12 counterclockwise. The edges 27 of the springs will engage corners 21 of the shell and further counterclockwise rotation of the shell will cause cams 25 to abut the side walls of slots 26, rotating body 12 counterclockwise.

What is claimed is:
1. In a torque limiting nut, a generally tubular body having a substantially cylindrical outer surface and hav- ing a threaded bore throughout its length, a polygonal shell mounted on and surrounding said body and having flat inner surfaces with sharp junctures radially spaced from said body and an arcuate leaf spring disposed between said shell and body, one of said leaf spring having an inturned tab received by a radial slot in said body, the other end of said leaf spring having an edge freely engaging the shell at the juncture of two flat inner surfaces thereof said spring extending away from said inturned end throughout the remainder of its length in the direction in which the nut is to be rotated during application thereof and being unattached from its inturned tab throughout said remainder of its length, said spring having an unstressed shape such that it exerts an outward force therefor on said shell, whereby the friction between said spring and said shell permits rotation of said body during wrenching of said shell until a predetermined torque is reached, whereupon said spring tends to wrap around said body so that said body will turn no further.

2. The combination according to claim 1, the width of said spring being substantially equal to the length of said shell.

3. The combination according to claims 1 or 2, one end of said body having a flange overlapping one end of said shell, the other end of said shell having an inturned flange closely adjacent said body, and a retaining ring carried by said body adjacent said inturned flange.

4. The combination according to claims 1 or 2, further provided with a second leaf spring disposed between said shell and body diametrically opposite said first leaf spring and constructed similarly thereto, said second leaf spring having a tab in a groove formed in said body and extending in the same direction as said first spring.

References Cited

UNITED STATES PATENTS

| | | | |
|---|---|---|---|
| 2,685,812 | 8/1954 | Dmitroff | 85—61 |
| 3,289,524 | 12/1966 | Rubin | 85—61 |

RAMON S. BRITTS, Primary Examiner